Feb. 8, 1966 D. M. CHAPIN 3,234,406
TWO TRANSISTOR BISTABLE PUSH-PUSH CIRCUIT
ENERGIZED BY ALTERNATING CURRENT
Filed June 6, 1963
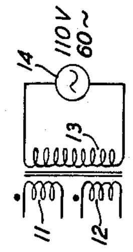
FIG. 2
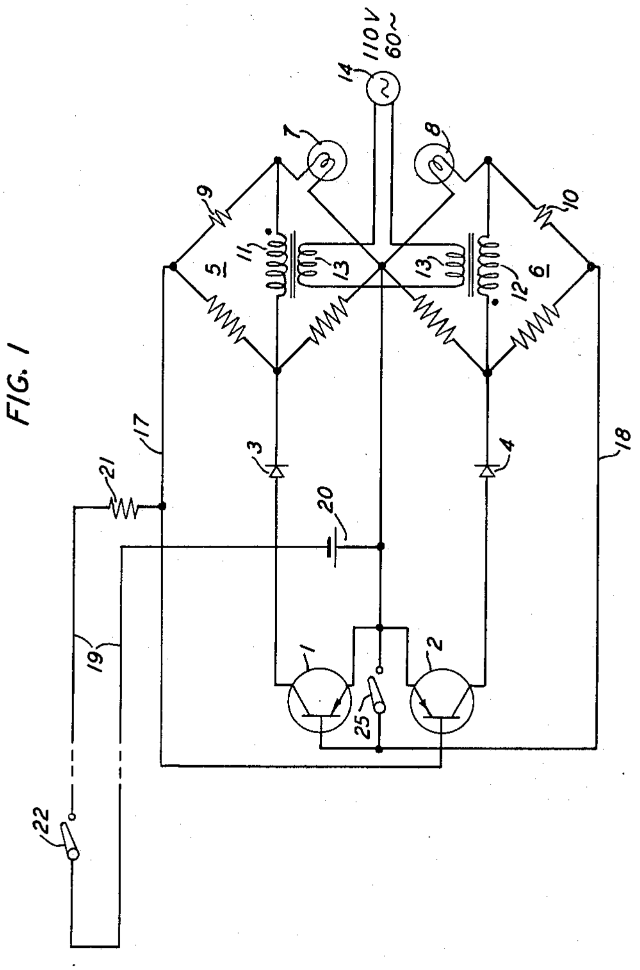
INVENTOR
D. M. CHAPIN
BY Harry C. Hart
ATTORNEY 3,234,406

TWO TRANSISTOR BISTABLE PUSH-PUSH CIRCUIT ENERGIZED BY ALTERNATING CURRENT

Daryl M. Chapin, Basking Ridge, N.J., assignor to Bell Telephone Laboratories, Incorporated, New York, N.Y., a corporation of New York Filed June 6, 1963, Ser. No. 285,994
2 Claims. (Cl. 307—88.5)

This invention deals with transistorized bistable circuits.

In a bistable circuit of the commonest type, i.e., a so-called "flip-flop," two active elements, e.g., transistors, are intercoupled with a source of direct current and with each other in such a way that an increase in the conduction of the one tends to reduce conduction of the other. With strong regenerative feedback around the entire loop constituted of the two transistors, the action is cumulative so that, when conduction of the one transistor is increased to a suitable point, as by application of an external signal, a landslide effect takes place, this transistor is driven to saturation, and the other member of the pair is driven to cutoff. Similarly, in response to an actuating signal of opposite polarity, or one applied to a different point of the circuit, the conditions are reversed. Hence, except for the brief transient condition which obtains in the course of reversal, one transistor is always cut off while the other is always saturated.

Situations arise, notably in signaling systems or alarm systems, in which a first required condition may endure for hours or even days, while a second required condition may endure for minutes or even seconds. In such situations it is obviously undesirable that the first condition be represented by heavy conduction of one transistor. This makes for undesirable power dissipation and raises the possibility of deterioration of the heavily conducting member. In such situations it is desirable that the long enduring conditions be represented by inactivity of both transistors, even though the opposite condition be represented by heavy conduction or saturation of both transistors for the brief period in which the second condition obtains. By analogy with circuits developed for use as amplifiers and modulators, a bistable circuit of the commoner type may be given the designation "push-pull," while one of the both-ON, both-OFF type may be given the designation "push-push." This second mode of operation has been secured, notably in Shockley 2,655,609 and in Weller 2,831,113 by employment of two transistors of opposite conductivity types—i.e., a PNP transistor paired with an NPN transistor. But while PNP transistors are readily fabricated with uniform characteristics and at low cost, this is by no means true of NPN transistors which are substantially more costly and less uniform in performance. Hence, there exists the need for a bistable circuit of the push-push variety employing two identical transistors, preferably those of the more uniform and less costly type.

The invention provides a push-push bistable circuit employing two identical transistors, e.g., PNP transistors. The mutual regenerative feedback required for push-push operation is secured by turning to account the wide spread between the hot resistance and the cold resistance of the incandescent filament of a signal lamp. In one illustrative embodiment the lamp is included as one arm of a Wheatstone bridge which is balanced when the lamp resistance is midway between its hot resistance and its cold resistance, and is unbalanced in one sense when the lamp is cold, and in the opposite sense when the lamp is hot. Such a bridge is associated with each transistor and the unbalanced voltage developed by it is applied to the base of the other transistor. A unilaterally conducting device, i.e., a silicon diode, is connected in the collector-emitter path of each transistor. Thus, while the transistor is in its OFF state, no current flows in this circuit and when it is in its ON state, current flows in only one direction.

In accordance with a further feature the bridges are energized only with alternating voltage, the thermal capacities of each lamp being turned to account in preventing a wide change in its temperature, and hence of its resistance, in the course of a single cycle of the voltage of the power source. The two bridges are energized in opposite phase, and hence, when the transistors are in their ON states, they conduct turn and turn about—one on voltage excursions of one polarity, and the other on voltage excursions of opposite polarity. The unbalanced signal transferred from the bridge associated with each transistor to the base of the other transistor is of a polarity such that, a transistor being in its OFF state, the conduction-promoting voltage swings applied to its base take place during the nonconducting half cycles for its collector and are consequently of no effect. To the contrary, the transistor being in its ON state and the unbalance of the bridge being reversed, the conduction-promoting voltage swings applied to its base take place during the conduction half cycles of its collector and are consequently effective to promote continued conduction. Thus, given that the lamps are cold, the unbalance voltage fed back from the bridge of each transistor to the base of the other transistor is of a phase such as to hold the transistor OFF while, under the opposite condition, when the transistor is ON and the lamp is hot, the phase of the feedback voltage is reversed and so holds the transistor ON, and this in turn continues to drive current through the lamp to hold it hot.

Because the mutual regenerative feedback thus tends to hold both transistors either in their OFF states or in their ON states, as the case may be, the system is bistable. When the transistors are OFF, they may be driven ON by brief application of an actuating signal to either transistor for a time sufficient to raise the temperature of the lamp, and so increase its resistance past the midpoint of its resistance range and so past the balance point of the bridge. Similarly, transistors may be returned to their OFF states and the lamps extinguished by a brief application of a reset signal which reduces conduction of one transistor to such a point that the lamp temperature, and hence the lamp resistance, fall below the balance point of the bridge.

For signaling purposes the incandescent lamps, the bridges which contain them, the transistors which operate them, and the resetting switch may conveniently be located at the receiver station of the signaling system, the initiating switch alone being located at the transmitter station. Thus the lamps at the receiver station, turned on by a signaling party elsewhere, remain illuminated until the attention of the signaled party has been called to them, whereupon the illumination has served its purpose and may be extinguished by the called party actuating the reset switch.

The invention will be fully apprehended from the following detailed description of an illustrative embodiment thereof taken in connection with the appended drawings in which:

FIG. 1 is a schematic circuit diagram showing a bistable transistor circuit embodying the invention; and FIG. 2 is a schematic circuit diagram showing the construction of the power transformer of FIG. 1.

Referring now to the drawings, FIG. 1 shows two transistors 1, 2, each intercoupled with the other by way of a Wheatstone bridge circuit. The collector of the upper transistor 1 is connected by way of a diode 3 to the left-hand terminal of the upper bridge 5 while the collector of the lower transistor 2 is connected by a second diode 4 to the left-hand terminal of the lower bridge 6. The left-hand terminal of each bridge is connected to its upper terminal by a ratio arm and is connected to the lower terminal by another ratio arm. The ratio arms of each bridge, for convenience designated the third and fourth arms, may advantageously be of like, and relatively high, resistance, e.g., of the order of 200 ohms. An incandescent lamp 7 having a normal amount of heat capacity and characterized by a wide spread between the hot resistance and the cold resistance of its filament, is included as the first arm of the upper bridge 5 while the second arm is constituted of a fixed resistor 9 whose resistance is of a magnitude intermediate between the hot resistance of the lamp and its cold resistance. A like lamp 8 and a like resistor 10 are similarly connected in the lower bridge 6. The horizontal diagonals of the bridges are constituted of the secondary windings 11, 12 of a transformer, of which the coils are so wound that the voltages developed in the secondary windings 11, 12 are always in phase opposition as indicated by the dots. For simplicity of illustration, the transformer coils are shown widely spaced apart. The actual construction should be the conventional one, shown in FIG. 2.

The upper terminal of the upper bridge 5 is connected by a conductive feedback path 17 to the base electrode of the lower transistor 2 while the lower terminal of the lower bridge 6 is similarly connected by another conductive feedback path 18 to the base electrode of the upper transistor 1. An initiating path 19 includes a bias battery, a protective resistor 21 and a starting switch 22.

In operation, the primary winding 13 of the transformer being energized and the lamps 7, 8 being cold, both bridges 5, 6 are unbalanced in such a sense that the alternating voltage developed at the third point of the upper bridge 5 and applied to the base electrode of the lower transistor 2 appears there is such phase that, in half cycles of the power source 14, during which the voltage applied between the emitter and the collector of that transistor tends to permit conduction, the base voltage tends to prevent it. The same is true of the lower bridge 6 and the upper transistor 1. Hence, the lamps being cold, the upper feedback path 17 holds the lower transistor 2 OFF while the lower feedback path 18 holds the upper transistor OFF. Once an initiating signal of appropriate polarity has been applied to the base electrode of either transistor, illustratively by closing the starting switch 22, collector current commences to flow in the emitter-collector path of the transistor thus turned ON. This acts to heat the lamp in the corresponding bridge.. As the lamp becomes hotter, its bridge passes through the balanced condition to unbalance in the opposite sense and the resulting phase-reversed potential which appears across the vertical diagonal of either bridge is fed back to the base electrode of the other transistor. The voltage thus fed back is now in such phase as to promote conduction during those half cycles of the power source 14 in which the voltage applied to the collector electrode of the transistor permits it. Consequently, conduction is promoted and the transistor is turned ON, further to heat its lamp. Thus, the flow of collector current in either transistor acts, by altering the balance of the associated bridge, to promote the flow of current in the other transistor. In consequence, the current flows of the two transistors and hence the illuminations of the two lamps are mutually self-sustaining. Moreover, as appears from the symmetry of the circuit, once the lamps 7, 8 are cold and the transistors 1, 2 are turned OFF, e.g., by actuation of a reset switch 25 which removes the bias from the base electrode of either transistor, the unbalance of each bridge tends by conductive feedback to hold the other transistor OFF. In this sense the circuit embodies OFF-holding feedback as well as ON-holding feedback and is bistable.

What is claimed is:

1. A bistable circuit which comprises two like transistors each having an emitter electrode, a collector electrode and a base electrode, said emitter electrodes being connected together and to a common emitter terminal, two Wheatstone bridges, each of four arms and four terminals, the first terminal of each bridge being connected to the common emitter terminal, a first arm of each bridge, interconnecting the first terminal with a second terminal, including an incandescent lamp characterized by a wide spread between its hot resistance and its cold resistance, a second arm, connected in series with said first arm between the second terminal and a third terminal, conjugate with the first terminal, including a resistor of resistance intermediate between said hot resistance and said cold resistance, series connected resistors, constituting third and fourth ratio arms, interconnecting the first terminal with the fourth, and the fourth with the third, in the case of each bridge, a conductive path including a unidirectionalily conducting device interconnecting the collector electrode of the first transistor with a fourth terminal of the first bridge, conjugate with its second terminal, a conductive path including a second unidirectionally conducting device interconnecting the collector electrode of the second transistor with a fourth terminal of the second bridge, conjugate with its second terminal, the third terminal of the first bridge being conductively connected to the base electrode of the second transistor, the third terminal of the second bridge being conductively connected to the base electrode of the first transistor, means for applying an alternating voltage in one phase between the second and fourth terminals of the first bridge, means for applying an alternating voltage of like magnitude and frequency and of opposite phase between the second and foutrh terminals of the second bridge, whereby an alternating voltage is fed back from the bridge of each transistor to the base of the other transistor in conduction-preventing phase when the lamp is cold and in conduction-promoting phase when the lamp is hot, actuating means for momentarily applying a conduction-promoting bias to the base electrode of at least one transistor, whereby upon actuation of said switch to initiate conduction in one transistor, mutually regenerative feedback takes place driving both transistors into their ON states, thereby to illuminate both lamps, and a resetting switch interconnecting the common emitter terminal with the base electrode of at least one transistor.

2. A bistable circuit which comprises two like transistors each having an emitter electrode, a collector electrode and a base electrode, said emitter electrodes being connected together and to a common emitter terminal, a conductive path extending from the collector of the first transistor to the common emitter terminal and including, in series, a unidirectionally conductive device, an incandescent lamp characterized by a wide spread between its hot resistance and its cold resistance and a source of alternating voltage of preassigned phase, a conductive path extending from the collector of the second transistor to the common emitter terminal and including, in series, a second unidirectionally conductive device, a second incandescent lamp characterized by a wide spread between its hot resistance and its cold resistance and a source of alternating voltage of opposite phase, a lamp-temperature responsive network interconnecting the collector electrode of each transistor with the common emitter terminal and proportioned to develop at its output terminal an alternating voltage of one phase when the lamp is cold and of opposite phase when the lamp is hot, a conductive feedback path extending from the output terminal of the network of each transistor to the base electrode of the other transistor, each of said unidirectionally conductive devices being poled in a sense that, when the voltage applied between the emitter and the collector of either transistor is in conduction-permitting phase, the cold-phase voltage fed back to its base electrode is in conduction-preventing phase while the hot-phase voltage fed back to said base electrode is in conduction-promoting phase, actuating means for momentarily applying a conduction-promoting bias to the base electrode of at least one transistor, whereby upon actuation of said switch to initiate conduction in one transistor, mutually regenerative feedback takes place driving both transistors into their ON states, thereby to illuminate both lamps, and a resetting switch interconnecting the common emitter terminal with the base electrode of at least one transistor.

References Cited by the Examiner

FOREIGN PATENTS 639,230 6/1950 Great Britain.
344,544 3/1960 Switzerland.

JOHN W. HUCKERT, *Primary Examiner.*